(12) United States Patent
Kwon et al.

(10) Patent No.: US 9,671,530 B2
(45) Date of Patent: Jun. 6, 2017

(54) OPTICAL MEMBER SUPPORTER AND CURVED DISPLAY DEVICE INCLUDING THE SAME

(71) Applicant: Samsung Display Co., Ltd., Yongin-si, Gyeonggi-do (KR)

(72) Inventors: Myungseok Kwon, Seongnam-si (KR); Sang Hoon Lee, Hwaseong-si (KR); Suchang Ryu, Asan-si (KR); Kyoungho Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 34 days.

(21) Appl. No.: 14/924,875

(22) Filed: Oct. 28, 2015

(65) Prior Publication Data

US 2016/0223726 A1 Aug. 4, 2016

(30) Foreign Application Priority Data

Feb. 2, 2015 (KR) .................. 10-2015-0016116

(51) Int. Cl.
*G02B 5/02* (2006.01)

(52) U.S. Cl.
CPC .................. *G02B 5/0278* (2013.01)

(58) Field of Classification Search
USPC ...................................... 362/97.4
See application file for complete search history.

(56) References Cited

U.S. PATENT DOCUMENTS

| 8,648,979 B2* | 2/2014 | Kuromizu | G02F 1/133608 349/58 |
| 8,657,456 B2* | 2/2014 | Yamagata | G02F 1/133308 349/58 |
| 8,827,482 B2* | 9/2014 | Yoshikawa | G02F 1/133608 362/249.01 |
| 2010/0073596 A1 | 3/2010 | Jeong et al. | |
| 2013/0314899 A1 | 11/2013 | Ye et al. | |
| 2013/0321740 A1 | 12/2013 | An et al. | |
| 2014/0078720 A1* | 3/2014 | An | G02F 1/133603 362/97.1 |
| 2015/0160407 A1* | 6/2015 | Hsiao | G02F 1/133308 349/65 |
| 2015/0219324 A1* | 8/2015 | Kim | G02F 1/133305 349/58 |

FOREIGN PATENT DOCUMENTS

| JP | 2009-272199 A | 11/2009 |
| KR | 1020100033196 A | 3/2010 |
| KR | 1020130132192 A | 12/2013 |

* cited by examiner

*Primary Examiner* — Laura Tso
(74) *Attorney, Agent, or Firm* — Cantor Colburn LLP

(57) ABSTRACT

A display device includes: a display panel curved in a direction; a lower frame in which the display panel is accommodated, the lower frame curved in the direction in which the display panel is curved; an optical member between the display panel and the lower frame, the optical member curved in the direction in which the display panel is curved; and an optical member supporter of which an upper end portion thereof is coupled to the optical member curved in the direction in which the display panel is curved and an opposing lower end portion thereof is coupled to the lower frame curved in the direction in which the display panel is curved.

20 Claims, 14 Drawing Sheets

OPTICAL MEMBER SUPPORTER AND CURVED DISPLAY DEVICE INCLUDING THE SAME

This application claims priority to Korean Patent Application No. 10-2015-0016116, filed on Feb. 2, 2015, and all the benefits accruing therefrom under 35 U.S.C. §119, the disclosure of which is incorporated herein in its entirety by reference.

BACKGROUND

1. Field

Exemplary embodiments of the invention relate to a display device in which a uniform interval between a light source and an optical member is maintained.

2. Description of the Related Art

Display devices are categorized into a liquid crystal display ("LCD") device, an organic light emitting diode ("OLED") display device, a plasma display panel ("PDP") device, an electrophoretic display ("EPD") device, and the like based on a light emitting method therein.

As for non-self-emission type display devices such as an LCD device, a display panel included therein which displays an image may not generate and emit light therein. Thus, within the self-emission type display devices, a backlight unit for generating and supplying light to the display panel may be provided.

The backlight unit may include a point light source such as a light emitting diode ("LED"). The LED is advantageous over a cold cathode fluorescent lamp in relatively low power consumption and excellent color reproduction properties thereof. The backlight unit may be classified into an edge-type backlight unit and a direct-type backlight unit, based on a position of the point light source such as a plurality of LEDs. The direct-type backlight unit may include a plurality of LEDs disposed at a lower portion of the display panel within the display device.

The backlight unit may include an optical member for improving an optical property of light provided from the plurality of LEDs, and at least one optical member supporter for supporting the optical member.

As an overall screen size of display devices increases, a viewing angle difference may be disadvantageously increased therealong between a position at a center portion of the screen and positions at left and right end portions of the screen. In order to compensate for such a viewing angle difference, a curved display device has been developed in which left and right end portions of the screen are disposed along a concavely curved screen with respect to a center portion thereof.

SUMMARY

Exemplary embodiments of the invention are directed to a display device including a display panel having improved luminance by maintaining a uniform interval between a light source and an optical member within the display device.

According to an embodiment of the invention, a display device includes: a display panel curved in a direction; a lower frame in which the display panel is accommodated, the lower frame curved in the direction in which the display panel is curved; an optical member between the display panel and the lower frame, the optical member curved in the direction in which the display panel is curved; and an optical member supporter of which an upper end portion thereof is coupled to the optical member curved in the direction in which the display panel is curved and an opposing lower end portion thereof is coupled to the lower frame curved in the direction in which the display panel is curved.

The optical member may define a guide hole therein to which the optical member supporter is coupled.

The optical member supporter may define a groove therein at an upper portion thereof, the groove aligned with the guide hole defined in the optical member.

The display device may further include a coupling member as a separate member from the optical member and the optical member supporter, the coupling member extending through the guide hole defined in the optical member and into the groove defined in the optical member supporter to couple the optical member to the optical member supporter.

The coupling member may be one of a screw, a bolt, a rivet and a hook.

In a plan view, a dimension of a portion of the coupling member may be greater than a dimension of the guide hole defined in the optical member.

The optical member may further define a step difference portion at the guide hole to surround the guide hole defined therein, and a portion of the coupling member may disposed in the step difference portion defined in the optical member.

In a cross-section, the step difference portion may have a tapered shape.

In both a plan view and a cross-section, the step difference portion defined in the optical member may have shapes the same as those of a portion of the coupling member.

An uppermost surface of the coupling member may be disposed at or below an uppermost surface of the optical member.

The coupling member may include a same material as that of the optical member.

The coupling member may include at least one of: polycarbonate ("PC"), a transparent acrylic resin, polystyrene ("PS"), polymethylmethacrylate ("PMMA") and polyethyleneterephthalate ("PET").

The optical member supporter may define a protrusion protruding from an upper portion thereof toward the optical member, the protrusion aligned with the guide hole defined in the optical member.

The protrusion defined by the optical member supporter may be one of a screw, a bolt, a rivet and a hook.

The display device may further include a coupling member as a separate member from the optical member and the optical member supporter, the coupling member extending through the guide hole and coupled to the protrusion defined by the optical member supporter to couple the optical member to the optical member supporter.

The display device may further include a coupling member as a separate member from the optical member and the optical member supporter. The protrusion defined by the optical member supporter extends through the guide hole and the coupling member is disposed outside the guide hole and in the step difference portion at the guide hole, the coupling member being coupled to the protrusion extended through the guide hole to couple the optical member to the optical member supporter.

In a plan view, a dimension of the coupling member may be greater than a dimension of the guide hole defined in the optical member.

The optical member supporter may define a hook protruding from an upper portion thereof toward the optical member. The hook defined by the optical member supporter may extend through the guide hole defined in the optical member to couple the optical member supporter to the optical member.

The optical member may include at least one of: a diffusion plate, a diffusion sheet, a prism sheet, and a protection sheet.

According to one or more exemplary embodiments of the invention, a display device may include a light source disposed between an optical member and a lower frame, and further include an optical member supporter of which a first end portion is coupled to the optical member and an opposing second end portion is coupled to a lower frame. Since the optical member supporter is coupled to both the optical member and the lower frame between which the light source is disposed, an interval between the light source and the optical member may be uniformly maintained.

According to one or more exemplary embodiments of the invention, a coupling member which couples the optical member supporter and the optical member to each other may include or be formed of a same material as that of the optical member in the display device, such that the optical member supporter does not interfere with a light path of light emitted from the optical member.

Further, according to one or more exemplary embodiments of the invention, the coupling member which couples the optical member supporter and the optical member to each other may not protrude upwards further than an upper surface of the optical member, such that the optical member supporter further does not interfere with a light path of light emitted from the optical member.

BRIEF DESCRIPTION OF THE DRAWINGS

The above and other features of the invention will be more clearly understood from the following detailed description taken in conjunction with the accompanying drawings, in which.

DETAILED DESCRIPTION

Figure 1:
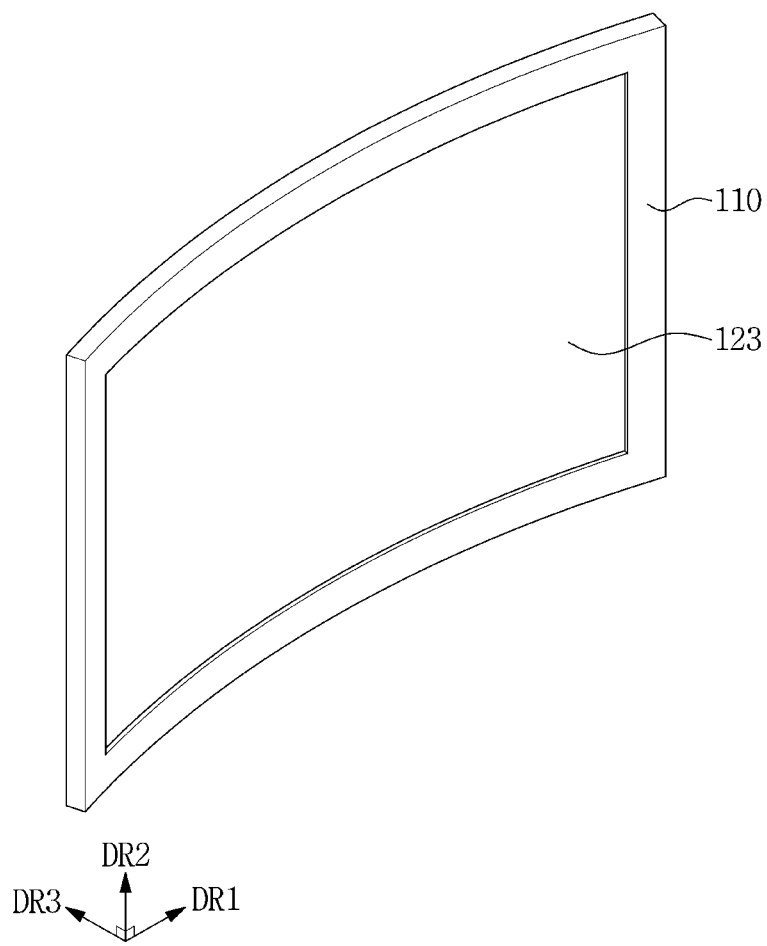
FIG. 1 is a perspective view illustrating an exemplary embodiment of a display device according to the invention.

Although the invention can be modified in various manners and has several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

Throughout the specification, when an element is referred to as being "connected" to another element, the element is "physically connected" to the other element or "electrically connected" to the other element with one or more intervening elements interposed therebetween. When an element is referred to as being "directly connected" to another element, the element is "directly physically connected" to the other element or "directly electrically connected" to the other element with no intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe exemplary embodiments of the invention, and like reference numerals refer to like elements throughout the specification.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A curved display device may be manufactured in a manner in which a display panel and an optical member that have an original flat form are coupled to an accommodation frame that has a predetermined radius of curvature. In this regard, the original flat form optical members are biased to return to the original flat form, and may become detached from an optical member supporter within the display device, rather than remaining in contact therewith. In particular, such a phenomenon may largely occur at the center portion of the optical member. Accordingly, the display panel may exhibit non-uniform luminance owing to the phenomenon where the optical member is detached from the optical member supporter.

Hereinafter, embodiments of the present disclosure of invention will be described in more detail with reference to the accompanying drawings.

The display device described below assumes that a display panel is a liquid crystal display ("LCD") panel, but the invention is not limited thereto. In exemplary embodiments, the display panel of the display device may be an organic light emitting diode ("OLED") panel.

Herein, the exemplary embodiment of the display device according to the invention is described as including a direct-type backlight unit, but the invention is not limited thereto. In exemplary embodiments, the backlight unit may be an edge-type backlight unit, a corner-type backlight unit, or a hybrid-type backlight unit in which features of the direct-type backlight unit and the edge-type backlight unit are combined.

Herein, the display device described reflects a landscape-type display device having a transverse (e.g., left-right or horizontal) length longer than a longitudinal (e.g., up-down or vertical) length in a top plan view and curved in the transverse direction, but the invention is not limited thereto.

Figure 2:
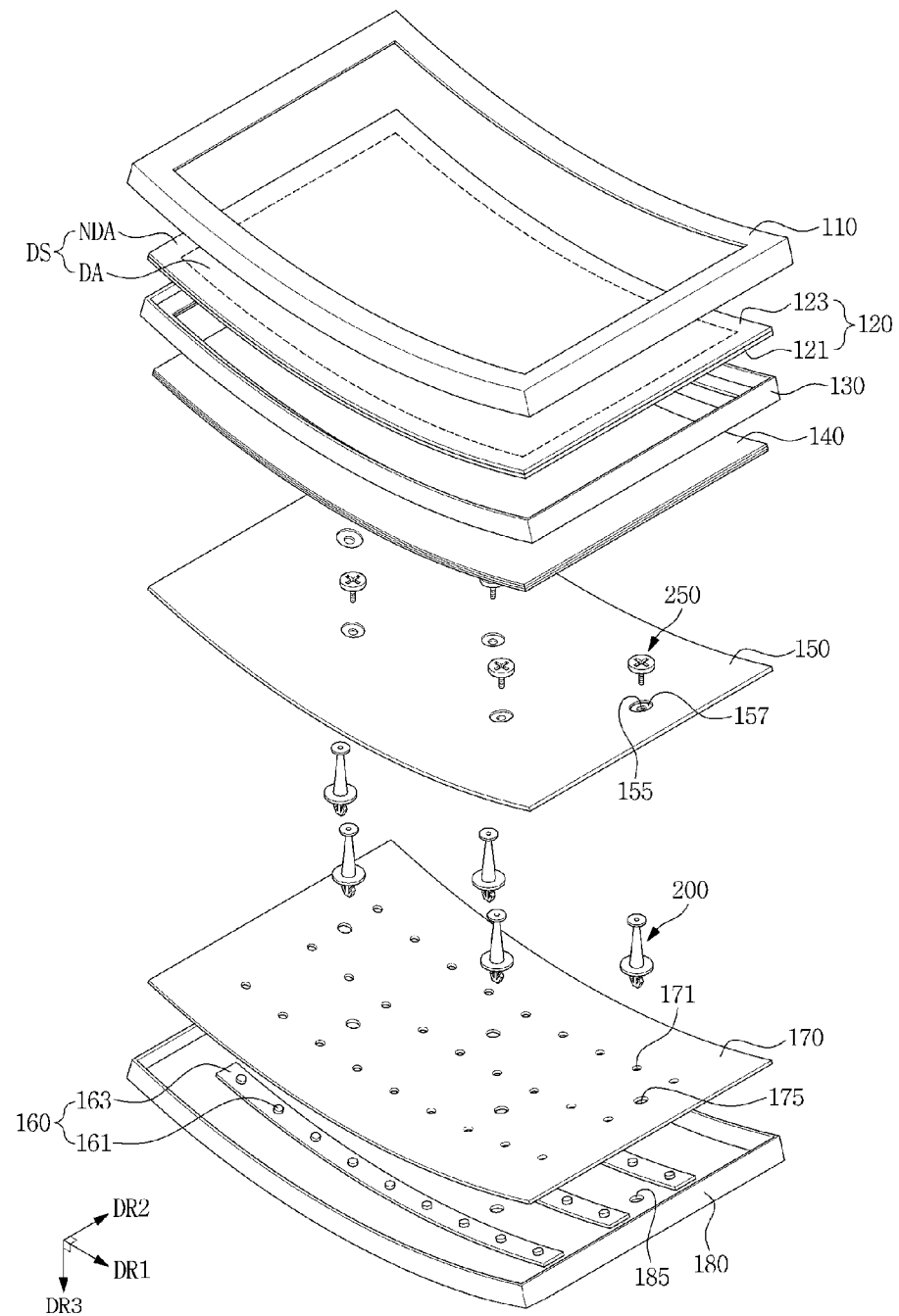
FIG. 2 is an exploded perspective view illustrating the display device of FIG. 1.

FIG. 1 is a perspective view illustrating an exemplary embodiment of a display device according to the invention; and FIG. 2 is an exploded perspective view illustrating the display device of FIG. 1.

In reference to FIGS. 1 and 2, the exemplary embodiment of the display device according to the invention may include an upper frame 110, a display panel 120, an intermediate frame 130, an optical sheet 140, an optical member 150, a light source unit 160, a reflection sheet 170 and a lower frame 180.

Hereinafter, the intermediate frame 130, the optical sheet 140, the optical member 150, the light source unit 160, the reflection sheet 170 and the lower frame 180 are collectively referred to as a backlight unit. Each of the above-listed elements may have a concavely curved form in accordance with a curved shape of the display device.

At least one optical element supporter 200 may be disposed between the optical member 150 and the lower frame 180, and a coupling member 250 may be disposed on the optical member 150 to couple the optical member 150 and the optical member supporter 200 to each other.

An accommodation frame including the upper frame 110, the intermediate frame 130 and the lower frame 180 may have a predetermined radius of curvature. The accommodation frame may have a radius of curvature in a range of about 1000 millimeters (mm) to about 5000 mm. The accommodation frame may have at least one radius of curvature, and may have more than one radius of curvature.

The display panel 120 may have a curved shape prior to being coupled to the accommodation frame, or may have a initial flat shape prior to being coupled to the accommodation frame to be curved by being coupled to the curved accommodation frame. That is, where the display panel 120 is flexible, the display panel 120 may have an initial flat shape prior to being coupled to the accommodation frame to be curved by being coupled to the accommodation frame. Where the display panel 120 is rigid, the display panel 120 may have a predetermined radius curvature prior to being coupled o the curved accommodation frame. Herein, the display panel 120 described below is assumed to have an initial flat form which is curved to have a predetermined radius of curvature by being coupled to curved the accommodation frame.

The display panel 120 may have a rectangular shape, in plane, such as in the top plan view. Herein, for ease of description, a long side direction of the display panel 120 is referred to as a transverse (first) direction DR1, a short side direction thereof is referred to as a longitudinal (second) direction DR2, and a thickness direction thereof is referred to as a third direction DR3 perpendicular to the first and second directions DR1 and DR2.

The display panel 120 may be a quadrangular panel which displays an image utilizing light, and may be a flexible panel that may be curved in at least one direction. The display panel 120 may have two sides (hereinafter "long sides") relatively longer than the other two remaining sides, the long sides being concavely curved to have a predetermined curvature. However, in exemplary embodiments, the display panel 120 may have the short sides thereof concavely curved to have a predetermined radius of curvature.

The display panel 120 may provide a display surface DS having a concavely curved surface shape. The display surface DS may include a display area DA on which a still image or a video is displayed and a non-display area NDA around the display panel DA and on which the still image or video is not displayed. The display area DA and the non-display area NDA may define a whole of the display surface DS.

The display panel 120 may include a first display substrate 121, a second display substrate 123 disposed to oppose the first display substrate 121, and a liquid crystal layer (not illustrated) disposed between the first and second display substrates 121 and 123.

The first display substrate 121 may include a plurality of pixel electrodes arranged in a matrix form on a first base substrate, a thin film transistor which applies a driving voltage to the respective pixel electrodes on the first base substrate, and various signal lines through which signals are transmitted to drive the pixel electrodes and the thin film transistor on the first display substrate.

The second display substrate 123 may be disposed to oppose the first display substrate 121 and include a common electrode including or formed of a transparent conductive material and a color filter on a second base substrate. The color filter may include a red color filter, a green color filter and a blue color filter, but the invention is not limited thereto.

The liquid crystal layer (not illustrated) may be interposed between the first and second display substrates 121 and 123. Orientations of liquid crystal molecules of the liquid crystal layer are rearranged in accordance with an electric field formed between the pixel electrode and the common electrode. Accordingly, the rearranged liquid crystal layer may adjust transmittance of light which was emitted from the backlight unit and the adjusted light may pass through the color filter, such that an image may be displayed outwards at a viewing side of the display device.

Further, a lower polarizing plate (not illustrated) and an upper polarizing plate (not illustrated) may further be disposed on a lower surface of the first display substrate 121 and an upper surface of the second display substrate 123, respectively. The upper polarizing plate and the lower polarizing plate may each have a planar area corresponding to a planar area of the display panel 120. The upper polarizing plate may pass therethrough a predetermined component of polarized light from among externally supplied light, and may absorb or block the remainder of the externally supplied light. The lower polarizing plate may pass therethrough a predetermined component of polarized light from among the light emitted from the backlight unit, and may absorb or block the remainder of the light emitted from the backlight unit. For purposes of description, a polarizing plate may be considered an element of a display panel.

A driving circuit board (not illustrated) may be disposed on at least one side of the display panel 120 to drive the display panel 120. The driving circuit board may apply various control signals and power signals to the display panel 120 to drive the display panel 120.

The upper frame 110 may define an opening window to allow the display area DA of the display panel 120 to be exposed outwards. The upper frame 110 may be disposed to cover an edge portion of a front surface and side surfaces of the display panel 120. The upper frame 110 may be fixed to the intermediate frame 130 and the lower frame 180 by a fixing member including, but not limited to, hooks and/or screws.

The upper frame 110 may be provided as a single unit, but alternatively, a plurality of units may be separately provided and then assembled to form the upper frame 110, where necessary. The upper frame 110 may include or be formed of a relatively rigid metal material such as stainless steel or a heat-dissipating material such as aluminum or an aluminum alloy.

The intermediate frame 130 may support the display panel 120, and may accommodate therein the optical sheet 140, the optical member 150, the light source unit 160 and the reflection sheet 170 and the like.

The intermediate frame 130 may have a polygonal frame shape in the top plan view and may define an empty space thereinside. In an exemplary embodiment, for example, the intermediate frame 130 may have a quadrangular frame shape and may define an empty space thereinside by lower and side portions thereof. The intermediate frame 130 may define an opening which exposes elements of the display device disposed therebelow. The intermediate frame 130 may be provided as a single unit, but alternatively, a plurality of units may be separately provided and then assembled to form the intermediate frame 130, where necessary.

The intermediate frame 130 may include or be formed of a flexible material such as plastic through an injection molding process and the like. In an exemplary embodiment of manufacturing a display device, the intermediate frame 130 may be formed to have a predetermined radius of curvature through an injection molding process and the like.

The optical sheet 140 may be disposed on the optical member 150 and may diffuse and/or collimate light directed from the optical member 150. The optical sheet 140 may be concavely curved in the transverse direction DR1.

The optical sheet 140 may collectively include a diffusion sheet, a prism sheet and/or a protection sheet. The diffusion sheet, the prism sheet and the protection sheet may be sequentially stacked on the optical member 150 in the order listed.

The optical member 150 may uniformly direct light provided from the light source unit 160 to the display panel 120. The optical member 150 may collectively include at least one of a diffusion sheet, a prism sheet and a protection sheet. Herein, the optical member 150 described below is assumed to be a diffusion plate. The optical member 150 may be manufactured to have an initial flat form, and then may be concavely curved in the transverse direction DR1 by being coupled to the curved accommodation frame.

The optical member 150 may have a guide hole 155 defined therein in which the optical member supporter 200 is disposed. The optical member 150 may define a step difference portion 157 at the guide hole 155 to surround the guide hole 155. The step difference portion 157 may define a surface which is not coplanar with an upper surface 150a of the optical member 150 to form a step difference with respect to the upper surface 150a of the optical member 150. Descriptions pertaining to the step difference portion 157 will be described further hereinbelow.

The optical member 150 may include a light-transmissive material, for example, at least one of polycarbonate ("PC"), a transparent acrylic resin, polystyrene ("PS"), polymethylmethacrylate ("PMMA") and polyethyleneterephthalate ("PET").

The light source unit 160 may be disposed on the lower frame 180. The light source unit 160 may include a light source 161 and a circuit board 163 on which the light source 161 is disposed.

The light source 161 may include at least one point light source such as a light emitting diode ("LED") chip (not illustrated) and an LED package (not illustrated) which accommodates the LED chip therein. In an exemplary embodiment, for example, the LED chip (not illustrated)

may be a gallium nitride (GaN)-based LED chip that generates and emits blue light. The light source 161 may be provided in plural on a single circuit board 163. The circuit board 163 may be provided in plural on the lower frame 180. The number of the light sources 161 and the circuit boards 163 with the light sources 161 thereon may vary in consideration of a planar size of the display panel 120, luminance uniformity and the like.

The circuit board 163 may be disposed to occupy a predetermined space along the transverse direction DR1 of the lower frame 180. The circuit board 163 may be a printed circuit board ("PCB") or a metal PCB.

The reflection sheet 170 may include or be formed of, for example, polyethylene terephthalate ("PET") to have a light reflective property. To provide the light reflective property thereof, the reflection sheet 170 may include silver (Ag) or titanium oxide ($TiO_x$) on a surface of a main portion thereof.

The reflection sheet 170 may include defined therein a penetrating hole 171 through which a light source 161 among a plurality of light sources 161 to passes, and a penetration hole 175 through which the optical member supporter 200 to be coupled to the lower frame 180 passes.

The lower frame 180 is responsible for maintaining an overall framework of the display device and may protect a variety of components accommodated therein. The lower frame 180 may be concavely curved in the transverse direction DR1. The lower frame 180 may have defined therein a penetration hole 185 through which the optical member supporter 200 to be coupled thereto passes.

The lower frame 180 may include a relatively rigid metal material such as stainless steel or a heat dissipating material such as aluminum or aluminum alloys.

The optical member supporter 200 may have an upper end portion coupled to the optical member 150 and a lower end portion coupled to the lower frame 180. The coupling member 250 may couple the optical member 150 and the optical member supporter 200 to each other. Hereinafter, detailed descriptions pertaining to the optical member supporter 200 and the coupling member 250 will be provided further.

Figure 3:
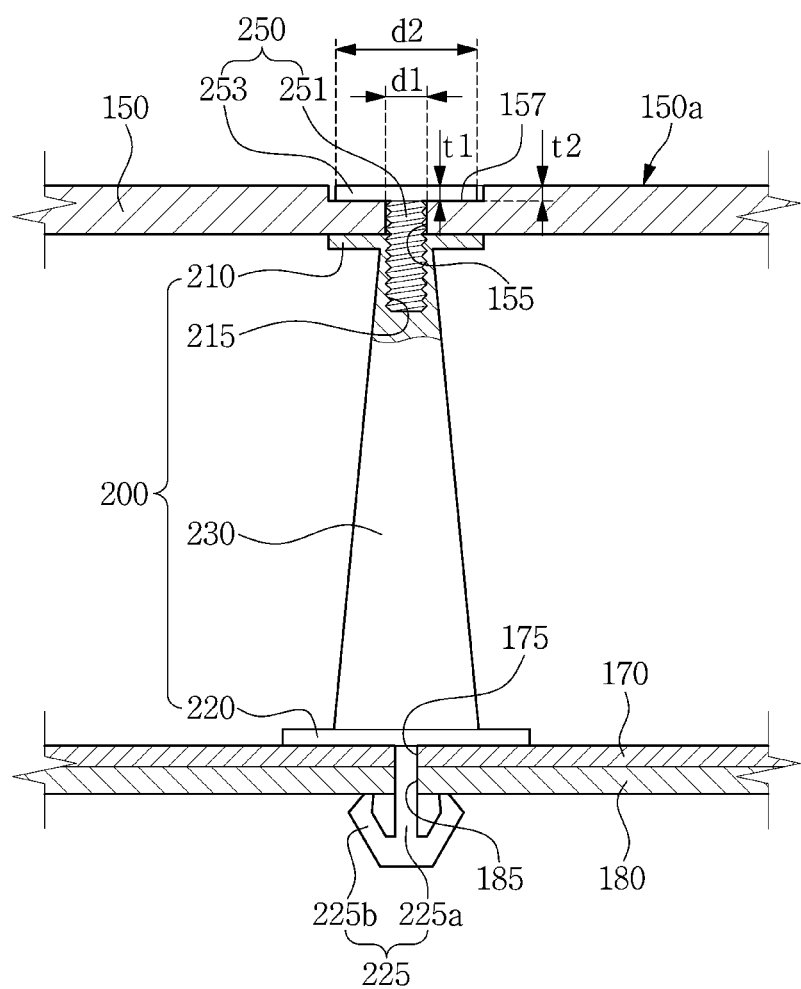
FIGS. 3, 4, and 5 are cross-sectional views respectively illustrating exemplary embodiments of an optical member supporter of a display device according to the invention.
Figure 4:
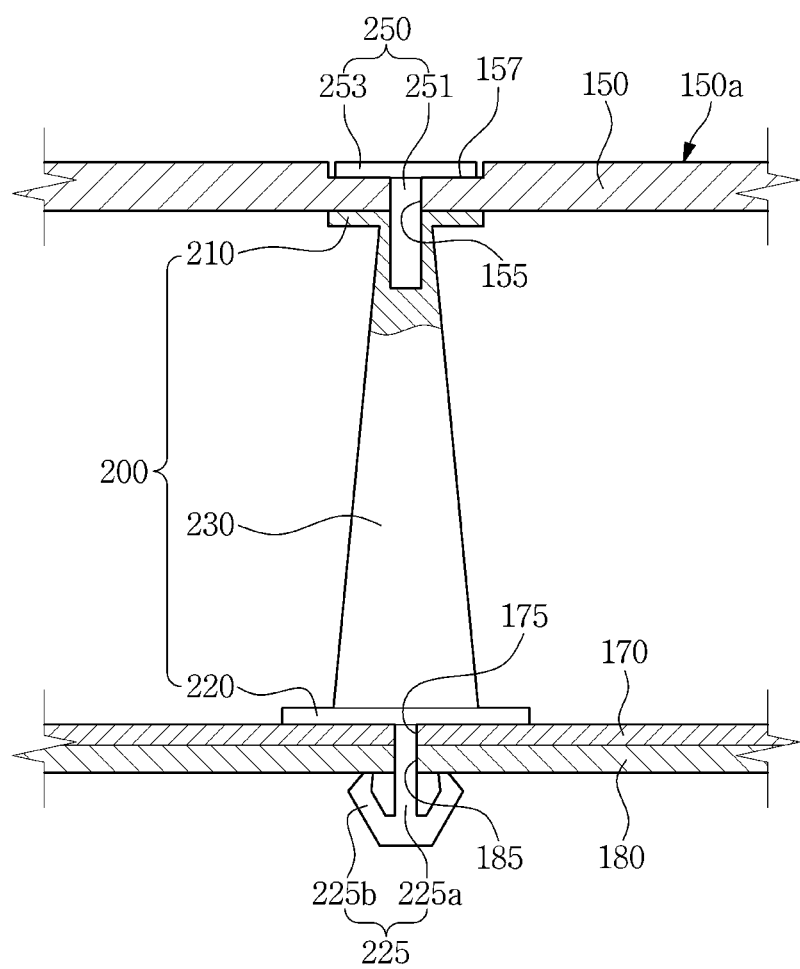
Figure 5:
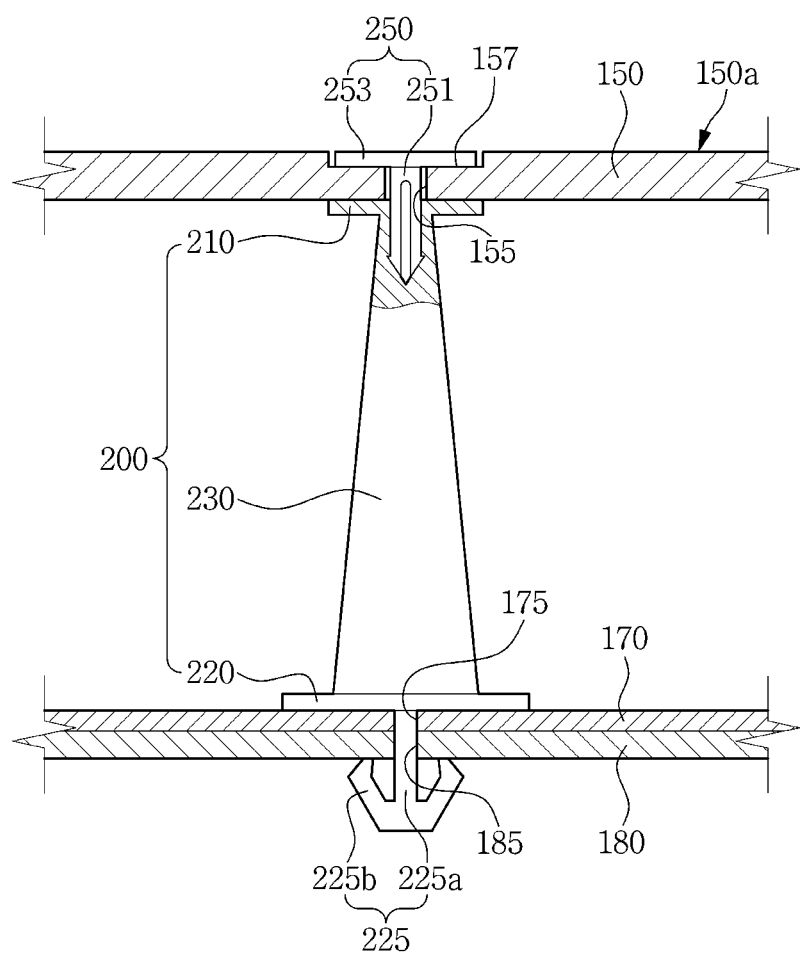
Figure 6:
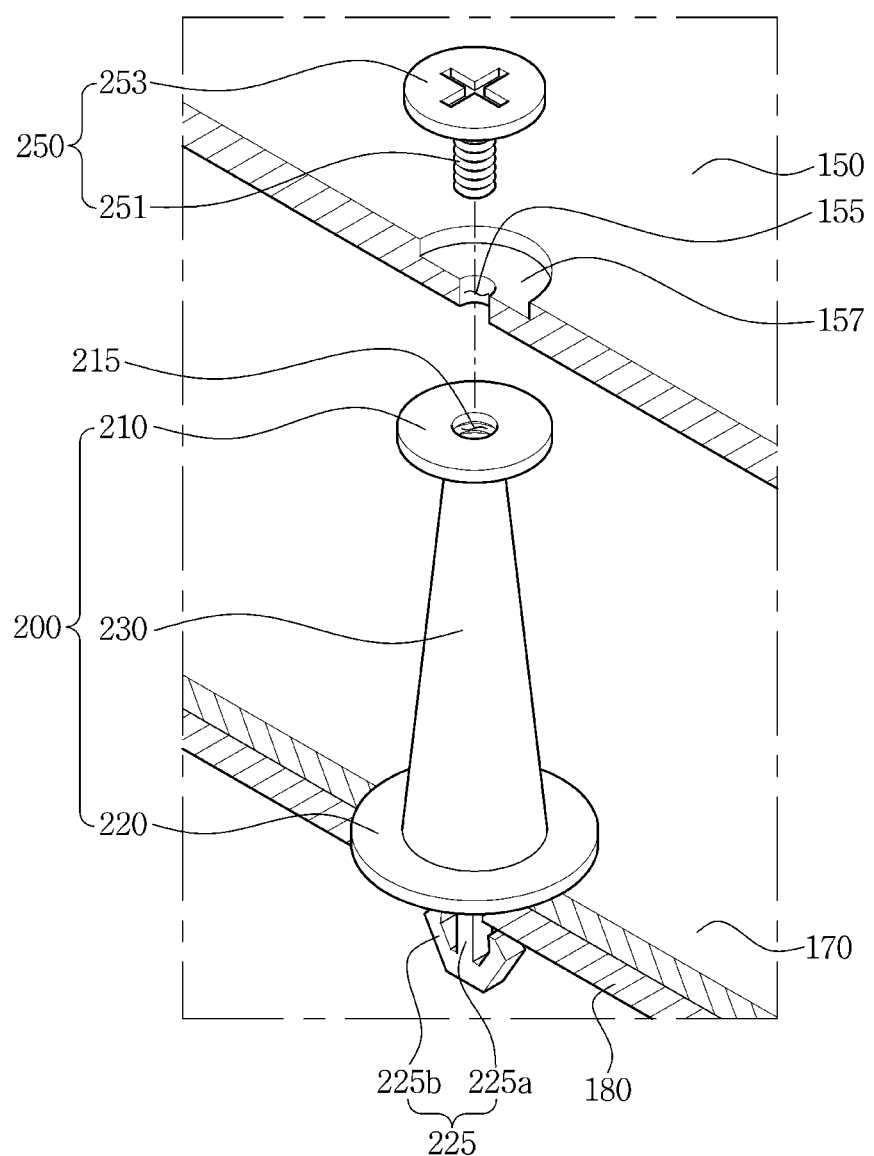
FIG. 6 is a view illustrating an exemplary embodiment of a coupling structure of an optical member and an optical member supporter representing the optical member supporters in FIGS. 3, 4, and 5 according to the invention.

FIGS. 3, 4 and 5 are cross-sectional views respectively illustrating exemplary embodiments of an optical member supporter 200 according to the invention; and FIG. 6 is a view illustrating an exemplary embodiment of a coupling structure of an optical member 150 and an optical member supporter 200 representing the general structure of the optical member supporters 200 illustrated in FIGS. 3, 4 and 5 according to the invention.

In reference to FIGS. 3, 4, 5 and 6, the optical member supporter 200 may define an upper portion 210 thereof at the optical member 150, a lower portion 220 thereof at the lower frame 180, and an intermediate portion 230 thereof disposed between the upper portion 210 and the lower portion 220 thereof, to maintain a uniform interval between the optical member 150 and the lower frame 180 in a cross-sectional thickness direction DR3.

The intermediate portion 230 may have a shape including a circular cylinder, a polygonal cylinder, a circular cone, a polygonal cone, a circular cone having a flat upper portion, and the like. Hereinafter, the intermediate portion 230 described below assumes a circular cone shape having a flat upper portion 210.

The optical member supporter 200 may include a light-transmissive material, for example, at least one of polycarbonate ("PC"), a transparent acrylic resin, polystyrene ("PS"), polymethylmethacrylate ("PMMA") and polyethyleneterephthalate ("PET").

The optical member supporter 200 may define a hook 225 protruding from the lower portion 220 thereof toward the lower frame 180. The hook 225 may include an inserting axis 225a disposed extended through the penetration hole 175 of the reflection sheet 170 and through the penetration hole 185 of the lower frame 180, and a locking unit 225b disposed outwardly of the lower frame 180. Referring to FIG. 3, the locking unit 225b may be disposed outwardly of the lower frame 180 after passing through the penetrating holes 175 and 185 in a top-down direction.

The optical member supporter 200 may have a groove 215 defined in the upper portion 210 thereof to extend from the upper portion 210 toward the intermediate portion 230. The groove 215 may be one of the followings: a screw groove (refer to FIG. 3) to which a screw, a bolt or the like may be fixed, a rivet groove (refer to FIG. 4) to which a rivet may be fixed, and a hook groove (refer to FIG. 5) to which a hook or the like may be fixed.

The coupling member 250 may include a body 251 which extends through the guide hole 155 defined in the optical member 150 to be coupled to the groove 215, and a fixation portion 253 seated on the step difference portion 157 of the optical member 150.

The coupling member 250 may be one of a screw (refer to FIG. 3), a bolt, a rivet (refer to FIG. 4), and a hook (refer to FIG. 5). Accordingly, where the coupling member 250 is a screw, the body 251 may be a screw body, and the fixation portion 253 may be a screw head.

A portion of the coupling member 250 may have a dimension which is greater than a dimension d1 of the guide hole 155. In an exemplary embodiment, for example, a diameter d2 of the fixation portion 253 of the coupling member 250 may be greater than the diameter d1 of the guide hole 155.

In addition, a thickness t1 of the fixation portion 253 in the step difference portion 157 may be less than or equal to a height t2 defined by the step difference portion 157. Accordingly, the fixation portion 253 may not protrude upwards further than the upper surface 150a of the optical member 150. That is, a light path of the optical member 150 may not be influenced by the presence of the fixing portion 250 since an uppermost surface of the fixation portion 253 terminates at or below the upper surface 150a of the optical member 150.

The step difference portion 157 may have a shape substantially the same as a shape of at least a portion of the coupling member 250. That is, the step difference portion 157 may have a cross-section and a plane shape substantially the same as those of the fixation portion 253 of the coupling member 250.

According to an exemplary embodiment, where the coupling member 250 is a cylindrical head screw, the step difference portion 157 may have a rectangular cross-section as illustrated in FIG. 5, and may have a circular plane as illustrated in FIG. 6. In another exemplary embodiment, where the coupling member 250 is a countersunk screw, the step difference portion 157 may have a tapered cross-section.

The coupling member 250, in particular, may include of be formed of a material the same as that of the optical member 150. The coupling member 250 may include a light-transmissive material, for example, at least one of polycarbonate ("PC"), a transparent acrylic resin, polystyrene ("PS"), polymethylmethacrylate ("PMMA") and polyethyleneterephthalate ("PET"). As the coupling member 250 and the optical member 150 include or are formed of the same material, a light path of the optical member 150 may not be influenced by the presence of the coupling member 250.

Since the optical member 150 is coupled to the lower frame 180 which has a predetermined radius of curvature in accordance with a curved shape of the display panel 120 and the display device, by the optical member supporter 200 and the coupling member 250, the optical member 150 may be curved such as to have the predetermined radius of curvature corresponding to that of the lower frame 180. Where the optical member is curved to have the predetermined radius of curvature corresponding to that of the lower frame 180, a distance between the lower frame 180 and the optical member 150, and consequently, a distance between the light source unit 160 on the lower frame 180 and the optical member 150, may be uniformly maintained.

Figure 7:
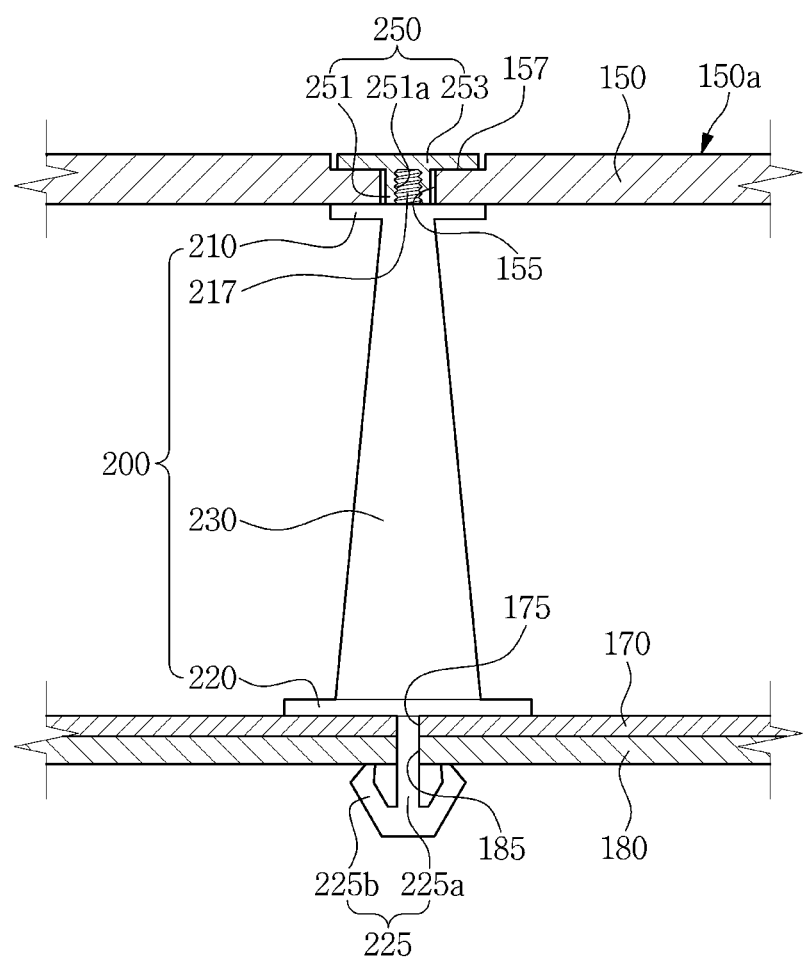
FIGS. 7 and 8 are cross-sectional views respectively illustrating other exemplary embodiments of an optical member supporter of a display device according to the invention.
Figure 8:
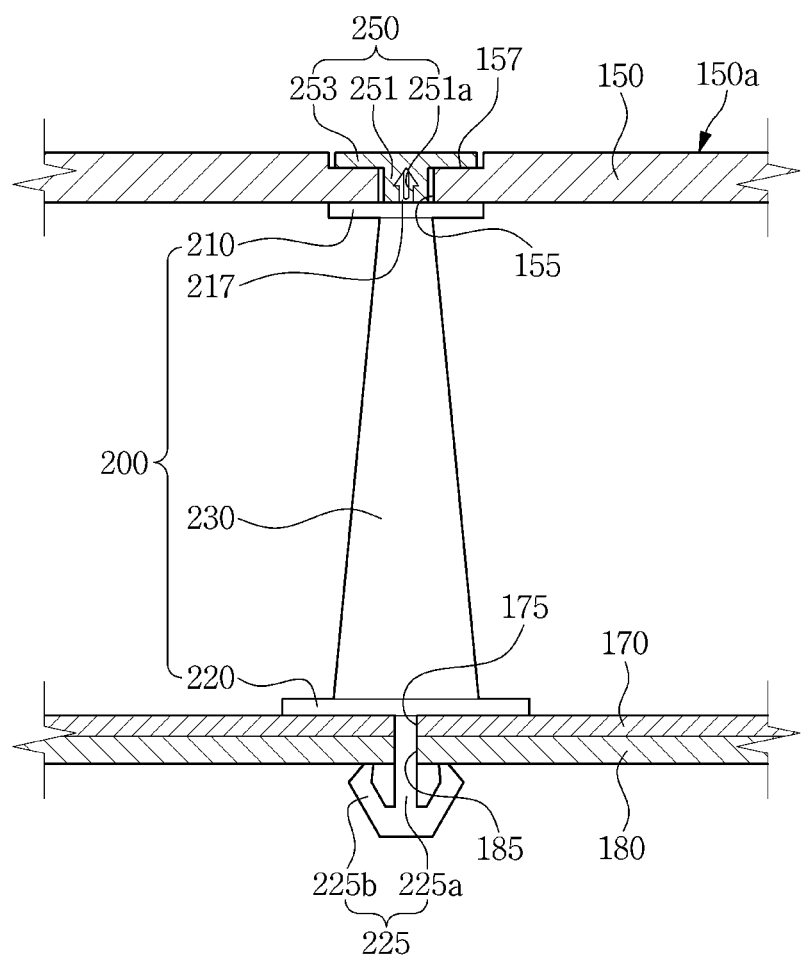
Figure 9:
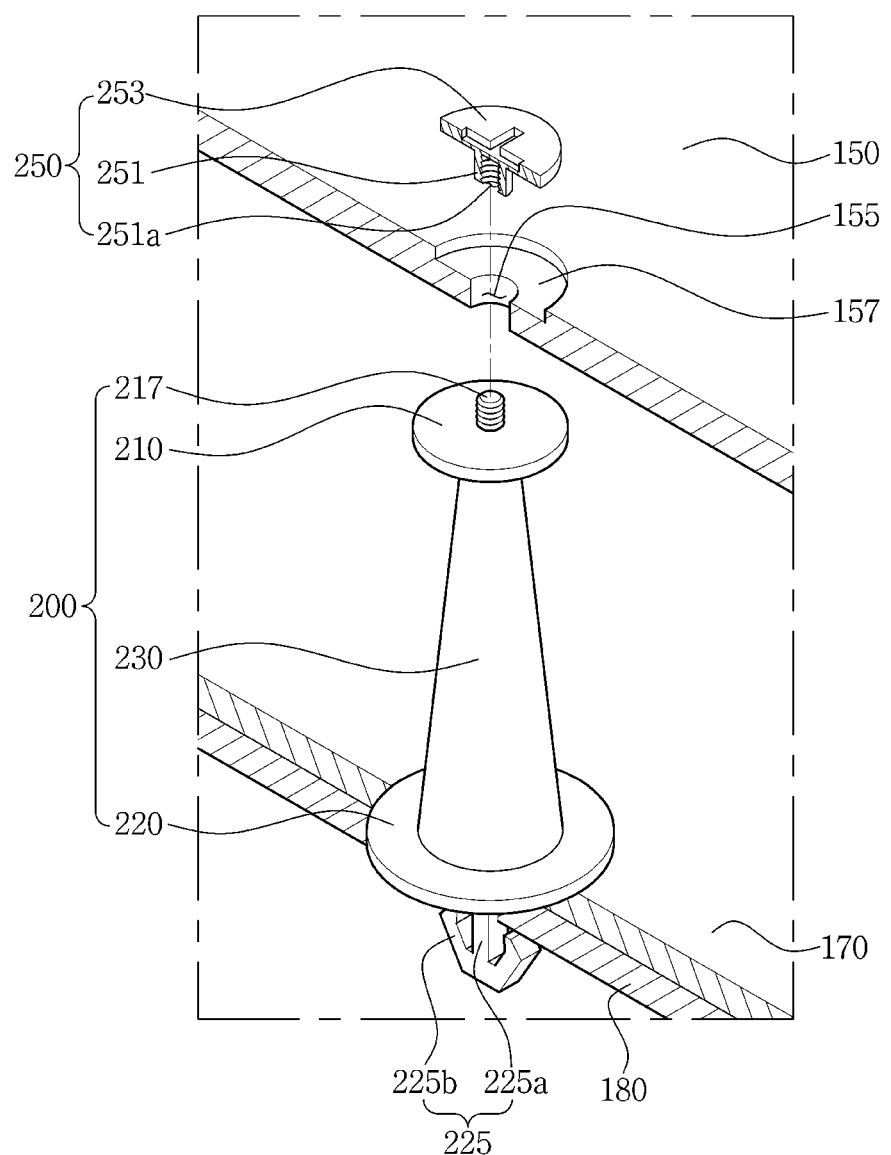
FIG. 9 is a view illustrating an exemplary embodiment of a coupling structure of an optical member and an optical member supporter representing the optical member supporters in FIGS. 7 and 8 according to the invention.

FIGS. 7 and 8 are cross-sectional views respectively illustrating other exemplary embodiments of an optical member supporter 200 according to the invention; and FIG. 9 is a view illustrating an exemplary embodiment of a coupling structure of an optical member 150 and an optical member supporter 200 representing the optical member supporters in FIGS. 7 and 8 according to the invention. Since like reference numerals refer to like elements throughout the specification, repeated descriptions pertaining to like-numbered elements in the exemplary embodiments of FIGS. 7, 8 and 9 will be omitted.

In reference to FIGS. 7, 8 and 9, exemplary embodiments of an optical member supporter 200 may define an upper portion 210 thereof at the optical member 150, a lower portion 220 thereof at the lower frame 180, and an intermediate portion 230 thereof disposed between the upper portion 210 and the lower portion 220 to maintain a uniform interval between the optical member 150 and the lower frame 180 in a cross-sectional thickness direction DR3.

The optical member supporter 200 may further define a protrusion 217 protruding from the upper portion 210 thereof toward the optical member 150.

The protrusion 217 may be one of a screw (refer to FIG. 7), a bolt, a rivet and a hook (refer to FIG. 8). A distal end of the protrusion 217 does not extend further than an upper surface 150*a* of the optical member 150.

A coupling member 250 may include a body 251 which extends through the guide hole 155 defined in the optical member 150 to be coupled to the protrusion 217 and a fixation portion 253 seated on the step difference portion 157 of the optical member 150.

The body 251 may have defined therein a groove 251*a* coupled to the protrusion 217. The groove 251*a* may be one of the followings: a screw groove (refer to FIG. 7) to which a screw, a bolt or the like may be fixed, a rivet groove to which a rivet may be fixed, and a hook groove (refer to FIG. 8) to which a hook or the like may be fixed.

Since the optical member 150 is coupled to the lower frame 180 which has a predetermined radius of curvature in accordance with a curved shape of the display panel 120 and the display device, by the optical member supporter 200 and the coupling member 250, the optical member 150 may be curved such as to have the predetermined radius of curvature corresponding to that of the lower frame 180. Where the optical member is curved to have the predetermined radius of curvature corresponding to that of the lower frame 180, a distance between the lower frame 180 and the optical member 150, and consequently, a distance between the light source unit 160 on the lower frame 180 and the optical member 150, may be uniformly maintained.

Figure 10:
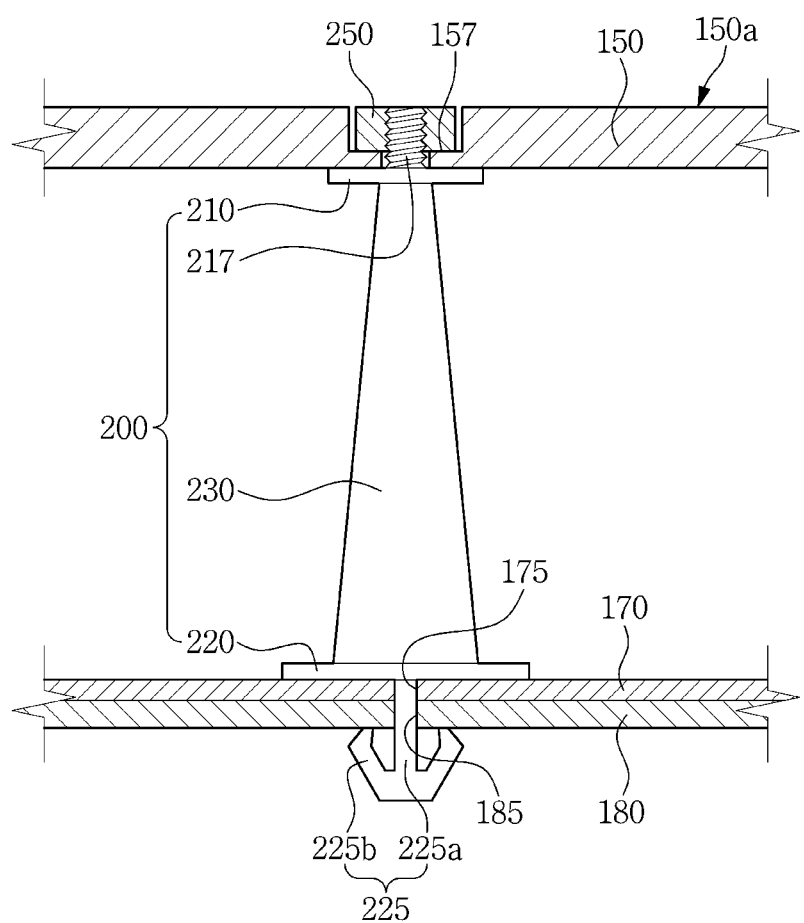
FIG. 10 is a cross-sectional view illustrating still another exemplary embodiment of an optical member supporter of a display device according to the invention.
Figure 11:
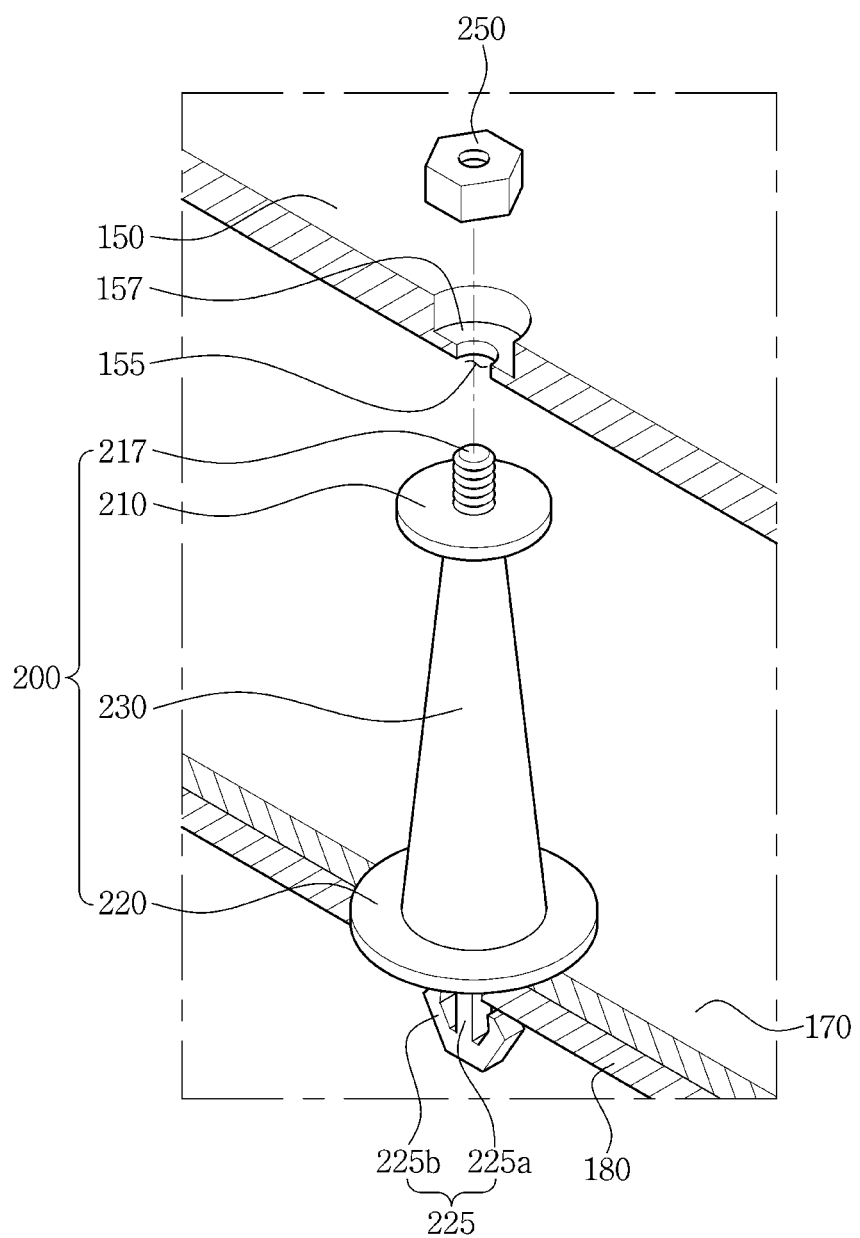
FIG. 11 is a view illustrating an exemplary embodiment of a coupling structure of an optical member and an optical member supporter representing the optical member supporter in FIG. 10 according to the invention.

FIG. 10 is a cross-sectional view illustrating still another exemplary embodiment of an optical member supporter 200 according to the invention; and FIG. 11 is a view illustrating an exemplary embodiment of a coupling structure of an optical member 150 and an optical member supporter 200 representing the optical member supporter in FIG. 10 according to the invention. Since like reference numerals refer to like elements throughout the specification, repeated descriptions pertaining to like-numbered elements in the exemplary embodiments of FIGS. 10 and 11 will be omitted.

In reference to FIGS. 10 and 11, an exemplary embodiment of the optical member supporter 200 may define an upper portion 210 thereof at the optical member 150, a lower portion 220 thereof at the lower frame 180, and an intermediate portion 230 disposed between the upper portion 210 and the lower portion 220 to maintain a uniform interval between the optical member 150 and the lower frame 180 in a cross-sectional thickness direction DR3.

The optical member supporter 200 may further define a protrusion 217 protruding from the upper portion 210 thereof toward the optical member 150. The protrusion 217 may be one of a screw, a bolt, a rivet and a hook. A distal end of the protrusion 217 does not extend further than an upper surface 150*a* of the optical member 150.

A coupling member 250 may be coupled to the protrusion 217 which extends through the guide hole 155 defined in the optical member 150. The coupling member 250 may include a nut or a stopper which exposes the protrusion 217 to outside the coupling member 250.

Further, a portion of the coupling member 250 disposed in a step difference portion 157 may have a thickness less than or equal to a height defined by the step difference portion 157. Accordingly, the coupling member 250 may not protrude upwards further than the upper surface 150*a* of the optical member 150. That is, a light path of the optical member 150 may not be influenced by the presence of the coupling member 250 since an uppermost surface of the coupling member 250 terminates at or below the upper surface 150*a* of the optical member 150.

Since the optical member 150 is coupled to the lower frame 180 which has a predetermined radius of curvature in accordance with a curved shape of the display panel 120 and the display device, by the optical member supporter 200 and the coupling member 250, the optical member 150 may be curved such as to have the predetermined radius of curvature corresponding to that of the lower frame 180. Where the optical member is curved to have the predetermined radius of curvature corresponding to that of the lower frame 180, a distance between the lower frame 180 and the optical member 150, and consequently, a distance between the light source unit 160 on the lower frame 180 and the optical member 150, may be uniformly maintained.

Figure 12:
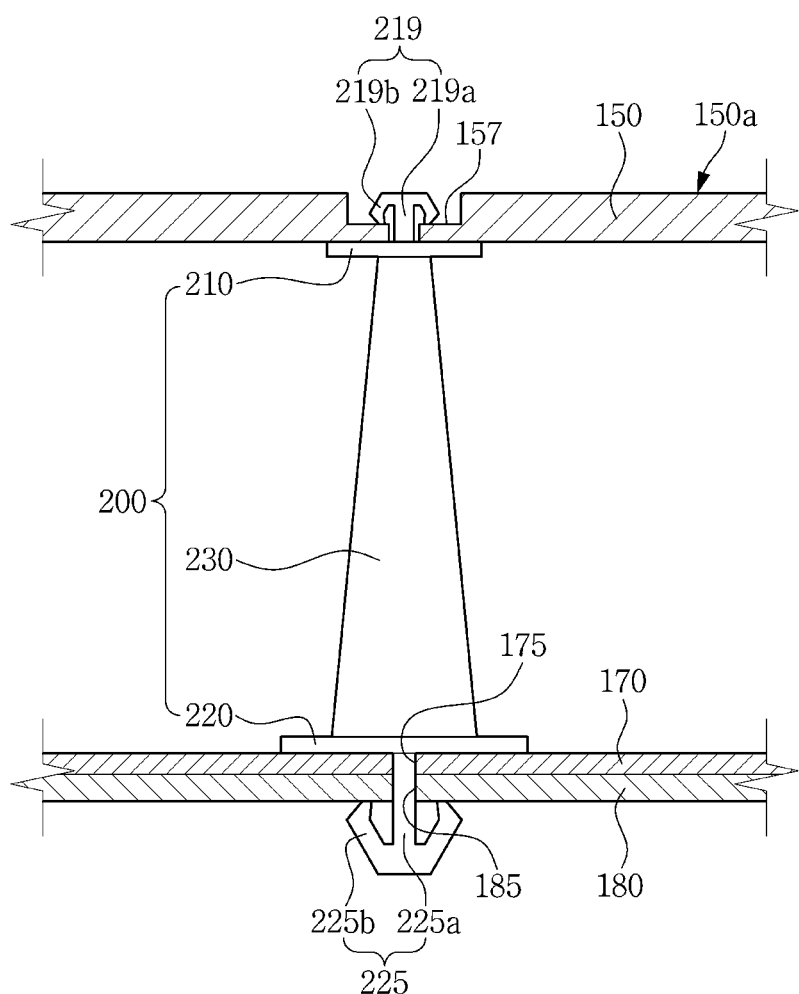
FIG. 12 is a cross-sectional view illustrating yet another exemplary embodiment of an optical member supporter another exemplary embodiment according to the invention.

FIG. 12 is a cross-sectional view illustrating yet another exemplary embodiment of an optical member supporter 200 according to the invention. Since like reference numerals refer to like elements throughout the specification, repeated descriptions pertaining to the exemplary embodiment in FIG. 12 will be omitted.

In reference to FIG. 12, an exemplary embodiment of an optical member supporter 200 may define an upper portion 210 thereof at the optical member 150, a lower portion 220 thereof at the lower frame 180, and an intermediate portion 230 thereof disposed between the upper portion 210 and the lower portion 220 to maintain a uniform interval between the optical member 150 and the lower frame 180 in a cross-sectional thickness direction DR3.

The optical member supporter 200 may further define a hook 219 protruding from the upper portion 210 thereof toward the optical member 150. The hook 219 may include an inserting axis 219a which extends through a guide hole 155 of the optical member 150, and a locking unit 219b disposed outwardly of the optical member 150. Referring to FIG. 12, the locking unit 219b may be disposed outwardly of the optical member 150 after passing through the guide hole 155 in a down-top direction.

Further, the hook 219 disposed in a step difference portion 157 may have a thickness less than or equal to a height defined by the step difference portion 157 such that a distal end of the optical member supporter 200 is at or below the upper surface 150a of the optical member 150. Accordingly, the hook 219 may not protrude upwards further than the upper surface 150a of the optical member 150. That is, a light path of the optical member 150 may not be influenced by the presence of the hook 219 since an uppermost surface of the hook 219 terminates at or below the upper surface 150a of the optical member 150.

The optical member supporter 200 may define a protrusion having various shapes protruding from the upper portion 210 thereof toward the optical member 150. In exemplary embodiments, for example, a dimension of a portion of the protrusion may be greater than a dimension of the guide hole 155. Accordingly, the protrusion may be coupled to the guide hole 155 in a plug-in or interference fit manner. To provide the interference fit, for example, a portion of the protrusion may be a sphere or a hexahedron in shape.

Figure 13:
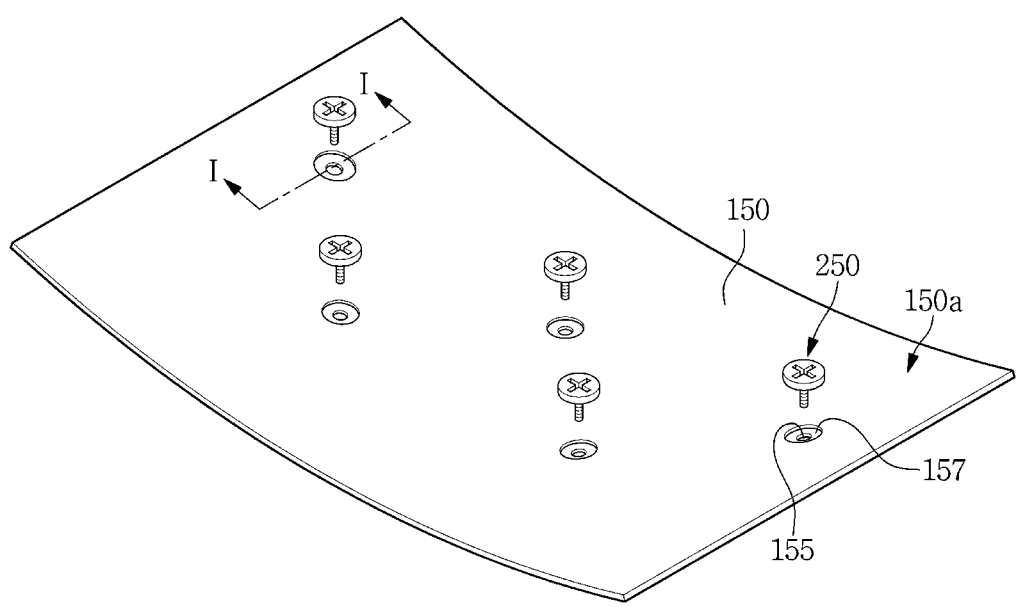
FIG. 13 is a plan view illustrating an exemplary embodiment of an optical member according to the invention.
Figure 14:
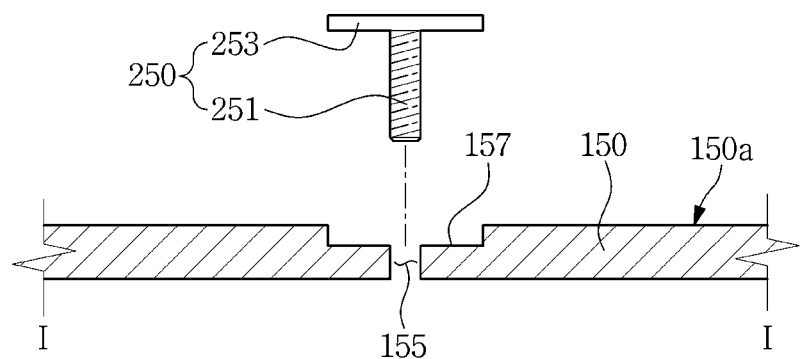
FIGS. 14 and 15 are cross-sectional views respectively illustrating other exemplary embodiments of an optical member taken along line I-I of FIG. 13 according to the invention.
Figure 15:
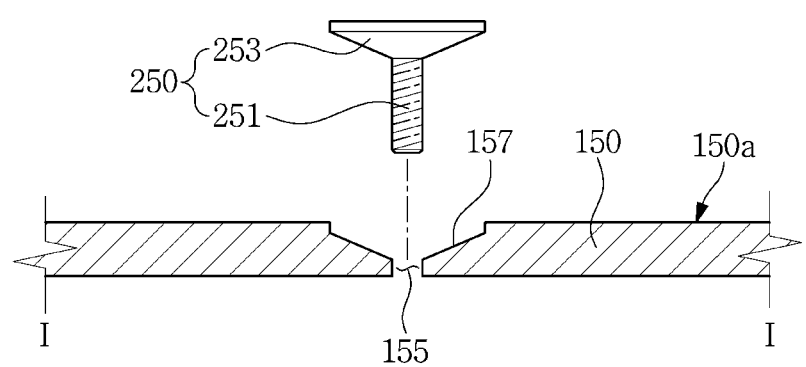

FIG. 13 is a plan view illustrating an exemplary embodiment of an optical member according to the invention; and FIGS. 14 and 15 are cross-sectional views respectively illustrating other exemplary embodiments of an optical member taken along line I-I of FIG. 13 according to the invention.

In reference to FIGS. 13, 14 and 15, a coupling member 250 may be disposed on the optical member 150. The optical member 150 may have a guide hole 155 defined therein at an area to which the coupling member 250 is disposed, and may define a step difference portion 157 at the guide hole 155 to surround the guide hole 155.

The step difference portion 157 may have a shape substantially the same as a shape of at least a portion of the coupling member 250. That is, the step difference portion 157 may have a cross-section and a plane shape substantially the same as those of a fixation portion 253 of the coupling member 250.

As illustrated in FIGS. 13 and 14, where the coupling member 250 is a cylindrical head screw, the step difference portion 157 may have a circular shape in the top plan view and a rectangular cross-section.

In addition, as illustrated in FIGS. 13 and 15, where the coupling member 250 is a circular countersunk screw, the step difference portion 157 may have a circular shape in the top plan view and a tapered cross-section.

The fixation portion 253 of the coupling member 250 does not protrude upwards further than an upper surface 150a of the optical member 150. Accordingly, a light path of the optical member 150 may not be influenced by the presence of the fixation portion 253 since an uppermost surface the fixation portion 253 terminates at or below the upper surface 150a of the optical member 150.

As set forth above, one or more exemplary embodiment of the display device according to the invention may include a light source disposed between an optical member and a lower frame, and further including an optical member supporter of which a first end portion is coupled to an optical member and an opposing second end portion is coupled to a lower frame. Since the optical member supporter is coupled to both the optical member and the lower frame between which the light source is disposed, an interval between the light source and the optical member may be uniformly maintained. A method of coupling the optical member supporter and the optical member is not limited to the aforementioned exemplary embodiments, and any commonly employed coupling methods may be applied without limitation. In exemplary embodiment, for example, the optical member supporter and the optical member may be coupled to each other through adhering or attachment to each other.

Further, in one or more exemplary embodiment of the display device according to the invention, a coupling member which couples the optical member supporter and the optical member to each other may include or be formed of a material the same as that of the optical member, and may not extend upwards further than an upper surface of the optical member, such that the optical member supporter does not interfere with a light path of light emitted from the optical member.

From the foregoing, it will be appreciated that various exemplary embodiments in accordance with the present disclosure have been described herein for purposes of illustration, and that various modifications may be made without departing from the scope and spirit of the present teachings. Accordingly, the various exemplary embodiments disclosed herein are not intended to be limiting of the true scope and spirit of the present teachings.

What is claimed is:

1. A display device comprising:
a display panel curved in a direction;
a lower frame in which the display panel is accommodated, the lower frame curved in the direction in which the display panel is curved;
an optical member between the display panel and the lower frame, the optical member curved in the direction in which the display panel is curved; and
an optical member supporter of which an upper end portion thereof is coupled to the optical member curved in the direction in which the display panel is curved and an opposing lower end portion thereof is coupled to the lower frame curved in the direction in which the display panel is curved.

2. The display device of claim 1, wherein the optical member defines a guide hole therein to which the optical member supporter is coupled.

3. The display device of claim 2, wherein the optical member supporter defines a groove therein at an upper portion thereof, the groove aligned with the guide hole defined in the optical member.

4. The display device of claim 3, further comprising a coupling member as a separate member from the optical member and the optical member supporter, the coupling member extending through the guide hole defined in the optical member and into the groove defined in the optical member supporter to couple the optical member to the optical member supporter.

5. The display device of claim 4, wherein the coupling member is one of a screw, a bolt, a rivet and a hook.

6. The display device of claim 4, wherein in a plan view, a dimension of a portion of the coupling member is greater than a dimension of the guide hole defined in the optical member.

7. The display device of claim 4, wherein
the optical member further defines a step difference portion at the guide hole to surround the guide hole defined therein, and
a portion of the coupling member is disposed in the step difference portion defined in the optical member.

8. The display device of claim 7, wherein in a cross-section, the step difference portion has a tapered shape.

9. The display device of claim 7, wherein in both a plan view and a cross-section, the step difference portion defined in the optical member has shapes the same as those of at least a portion of the coupling member.

10. The display device of claim 7, wherein an uppermost surface of the coupling member is disposed at or below an uppermost surface of the optical member.

11. The display device of claim 4, wherein the coupling member comprises a same material as that of the optical member.

12. The display device of claim 4, wherein the coupling member comprises at least one of polycarbonate, a transparent acrylic resin, polystyrene, polymethylmethacrylate and polyethyleneterephthalate.

13. The display device of claim 2, wherein the optical member supporter defines a protrusion protruding from an upper portion thereof toward the optical member, the protrusion aligned with the guide hole defined in the optical member.

14. The display device of claim 13, wherein the protrusion defined by the optical member supporter is one of a screw, a bolt, a rivet and a hook.

15. The display device of claim 13, further comprising a coupling member as a separate member from the optical member and the optical member supporter, the coupling member extending through the guide hole and coupled to the protrusion defined by the optical member supporter to couple the optical member to the optical member supporter.

16. The display device of claim 15, wherein
the optical member further defines a step difference portion at the guide hole to surround the guide hole defined therein, and
a portion of the coupling member is disposed in the step difference portion defined in the optical member.

17. The display device of claim 13, further comprising a coupling member as a separate member from the optical member and the optical member supporter,
wherein
the optical member further defines a step difference portion at the guide hole to surround the guide hole defined therein,
the protrusion defined by the optical member supporter extends through the guide hole, and
the coupling member is disposed outside the guide hole and in the step difference portion at the guide hole, the coupling member being coupled to the protrusion extended through the guide hole to couple the optical member to the optical member supporter.

18. The display device of claim 15, wherein in a plan view, a dimension of a portion of the coupling member is greater than a dimension of the guide hole defined in the optical member.

19. The display device of claim 2, wherein
the optical member supporter defines a hook protruding from an upper portion thereof toward the optical member, and
the hook defined by the optical member supporter extends through the guide hole defined in the optical member to couple the optical member supporter to the optical member.

20. The display device of claim 1, wherein the optical member comprises at least one of a diffusion plate, a diffusion sheet, a prism sheet and a protection sheet.

* * * * *